United States Patent
Muralidharan et al.

(10) Patent No.: US 9,919,667 B2
(45) Date of Patent: *Mar. 20, 2018

(54) BUMPER ASSEMBLY

(71) Applicant: Ford Global Technologies, LLC, Dearborn, MI (US)

(72) Inventors: Nirmal Muralidharan, Birmingham, MI (US); S. M. Iskander Farooq, Novi, MI (US); Srinivasan Sundararajan, Ann Arbor, MI (US); Mohammed Omar Faruque, Ann Arbor, MI (US); Dean M. Jaradi, Macomb, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 42 days.

This patent is subject to a terminal disclaimer.

(21) Appl. No.: 15/193,634

(22) Filed: Jun. 27, 2016

(65) Prior Publication Data

US 2017/0369013 A1    Dec. 28, 2017

(51) Int. Cl.
*B60R 19/18* (2006.01)
*B60R 19/34* (2006.01)

(52) U.S. Cl.
CPC .............. *B60R 19/18* (2013.01); *B60R 19/34* (2013.01); *B60R 2019/1806* (2013.01)

(58) Field of Classification Search
CPC ..................... B60R 19/18; B60R 2019/1893
See application file for complete search history.

(56) References Cited

U.S. PATENT DOCUMENTS 1,845,013 A * 2/1932 Antosh, Jr. ........... B60R 19/023
                                                    293/142
2,730,396 A * 1/1956 Johnson ................. B60R 19/44
                                                    116/28 R
4,061,384 A * 12/1977 Montgomery .......... B60R 19/18
                                                    293/109

(Continued)

FOREIGN PATENT DOCUMENTS

CN       102837655 A       12/2012
GB        2469013 A         9/2010

(Continued)

OTHER PUBLICATIONS

Co-pending U.S. Appl. No. 15/067,244, filed Mar. 11, 2016; application and drawings (21 pages).

(Continued)

*Primary Examiner* — Kimberly Berona
*Assistant Examiner* — Jordan S Fei
(74) *Attorney, Agent, or Firm* — Frank A. MacKenzie; Bejin Bieneman PLC

(57) ABSTRACT

A bumper includes a carrier having a wall extending along a longitudinal axis, and a first leg and a second leg extending away from the wall in a first direction. A plurality of fins are movably attached to the carrier between the first leg and the second leg, and are spaced from each other the longitudinal axis. The fins may be moved to a deployed position to reinforce the bumper to improve low-speed damageability of the bumper, and may be moved to an inactive position, which may allow a fascia to more easily deform relative to the deployed position to provide energy absorption for pedestrian impacts.

20 Claims, 12 Drawing Sheets

(56) References Cited

U.S. PATENT DOCUMENTS

| | | |
|---|---|---|
| 5,425,561 A | 6/1995 | Morgan |
| 6,089,628 A | 7/2000 | Schuster |
| 6,572,163 B1* | 6/2003 | Pickett .................... B60R 19/44 293/142 |
| 6,997,490 B2 | 2/2006 | Evans et al. |
| 7,959,197 B2 | 6/2011 | Agrahari et al. |
| 8,649,937 B2 | 2/2014 | Freienstein et al. |
| 9,067,552 B1* | 6/2015 | Cheng .................... B60R 21/013 |
| 9,205,794 B1* | 12/2015 | Farooq .................... B60R 19/18 |
| 2005/0104392 A1 | 5/2005 | Liebhard et al. |
| 2007/0257497 A1 | 11/2007 | Heatherington et al. |
| 2012/0019025 A1 | 1/2012 | Evans et al. |
| 2013/0221691 A1 | 8/2013 | Nagwanshi et al. |
| 2016/0046249 A1* | 2/2016 | Farooq .................... B60R 19/18 293/120 |

FOREIGN PATENT DOCUMENTS

| | | | |
|---|---|---|---|
| GB | 2549841 A | 11/2017 | |
| KR | 101495885 | 3/2015 | |
| WO | 9427840 A1 | 12/1994 | |
| WO | 2006114541 A2 | 11/2006 | |
| WO | 2017003070 A1 | 1/2017 | |

OTHER PUBLICATIONS

UKIPO Search Report for Application No. GB1710081.9 dated Nov. 14, 2017 (4 pages).

* cited by examiner

BUMPER ASSEMBLY

BACKGROUND

Vehicle bumpers may have a stiffness determined by the material and structure of the bumper. However, the desired stiffness of the bumper may be different depending on vehicle speed. For example, at a low vehicle speed, a higher stiffness may be desired to prevent damage to the bumper, while at a high vehicle speed, a lower stiffness may be desired to absorb energy during a pedestrian impact.

Several vehicle research organizations release test protocols and standards for vehicles directed to specific outcomes. For example, the Research Council for Automobile Repairs (RCAR) releases impact test protocols and standards for vehicles. One example RCAR impact test protocol is directed toward low speed damageability (LSD), i.e., damage to vehicle component at 15 kilometers per hour (kph). In another example, the National Highway Traffic Safety Administration (NHTSA) releases the Federal Motor Vehicle Safety Standards (FMVSS) Part 581, which describes impact test protocols for LSD of vehicle bumper systems. However, as described above, the stiffness of the bumper system for LSD may differ from the stiffness desired for pedestrian protection at higher vehicle speed, e.g., greater than 30 kph. In other words, requirements for LSD and pedestrian protection create competing design principles. There remains an opportunity to design a vehicle bumper that accounts for both low speed damageability and pedestrian impact.

DETAILED DESCRIPTION

With reference to the Figures, wherein like numerals indicate like parts throughout the several views, a bumper assembly 16 for a vehicle 10 includes a bumper 20 and two crush cans 14.

Figure 1:
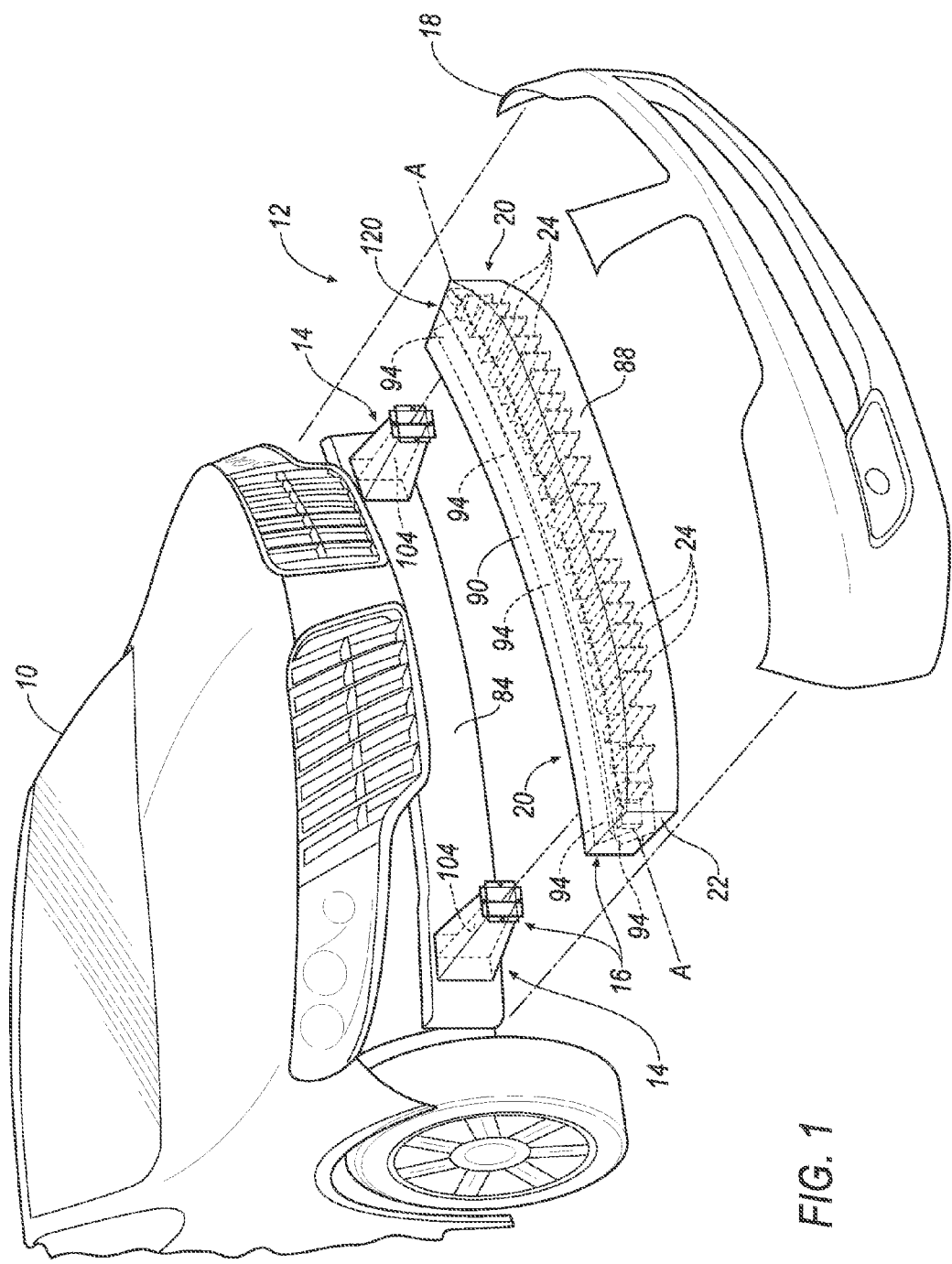
FIG. 1 is an exploded perspective view of a vehicle, with a bumper assembly, including a bumper and a fascia, exploded from the rest of the vehicle.
Figure 2A:
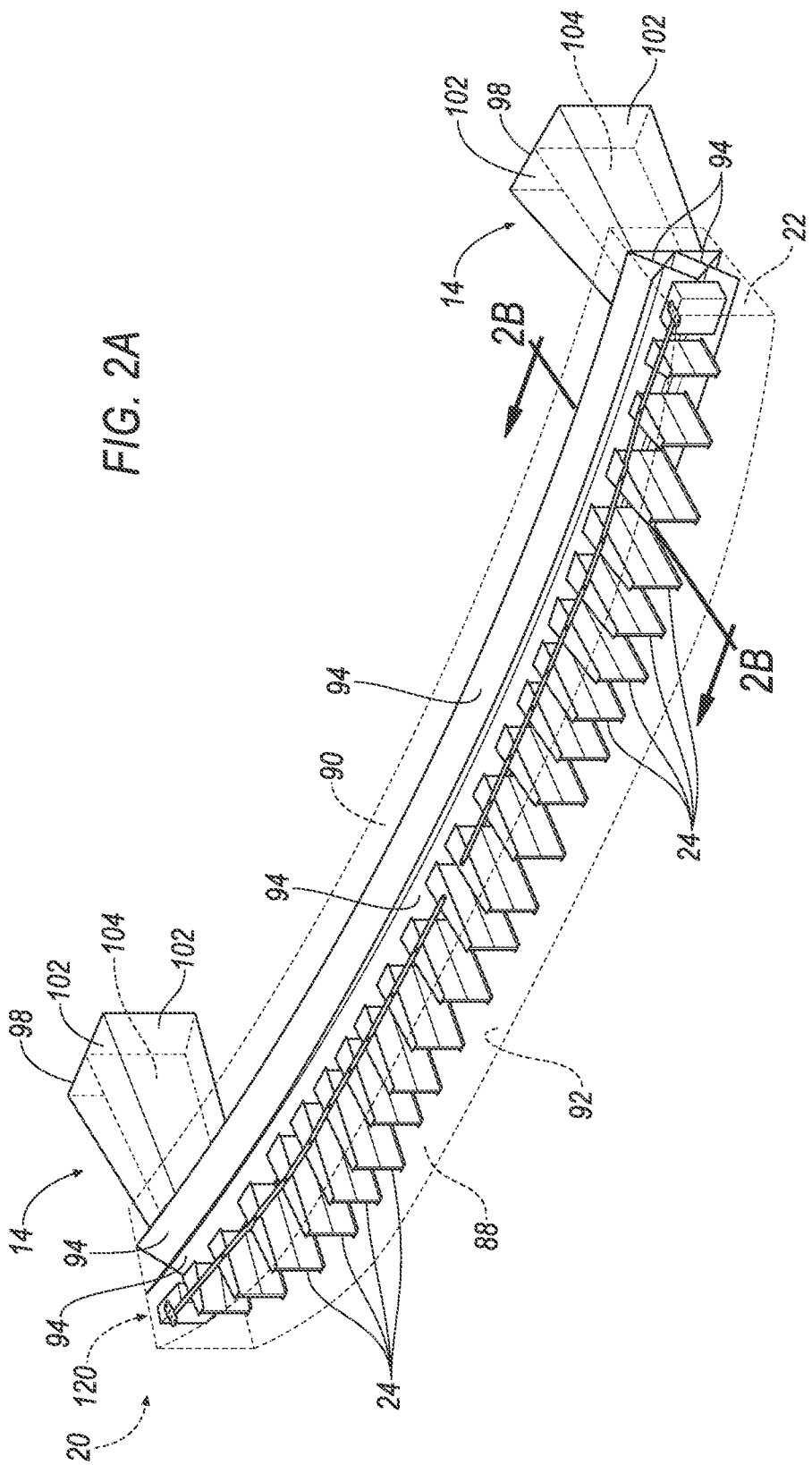
FIG. 2A is a perspective view of the bumper assembly, with a carrier of the bumper shown in hidden lines.

With reference to FIGS. 1-3, the bumper 20 includes a carrier 120 that has two ends 22 spaced from each other along a longitudinal axis A. The carrier 120 includes a wall 88, and includes a first leg 90 and a second leg 92 spaced from each other and extending from the wall 88. The bumper 20 includes fins 24 disposed between the first leg 90 and the second leg 92. The fins 24 are movably attached to the carrier 120 and are spaced from each other along the longitudinal axis A The carrier 120 includes stiffening ribs 94 fixed to the first leg 90 and the second leg 92. The stiffening ribs 94 are in a vehicle-rearward direction relative to the fins 24 when the bumper assembly 16 is mounted to the vehicle 10. The stiffening ribs 94 extend along the longitudinal axis A between the two ends 22 of the carrier 120. The stiffening ribs 94 reinforce the carrier 120 and the fins 24. Thus, the carrier 120 may be mounted directly to the crush cans 14 without intermediate reinforcing components.

The stiffening ribs 94 and the carrier 120 may be integral, i.e., formed together simultaneously as a single continuous unit. For example, the stiffening ribs 94 and the carrier 120 may be integrally formed by injection molding, extrusion, etc. Alternatively, the stiffening ribs 94 and the carrier 120 may be formed separately and subsequently assembled together. The stiffening ribs 94 and the carrier 120 may be the same type of material or different types of material. For example, the stiffening ribs 94 and the carrier 120 may be any suitable type of plastic, any suitable type of fiber reinforced plastic, any suitable type of plastic composite, etc.

As yet another alternative, the carrier 120 may include a metal insert (not shown). The metal insert can be encased in any of the above-identified materials, e.g., plastic, fiber reinforced plastic, plastic composite, etc.

The legs 90, 92 of the carrier 120 may extend from the wall 88 in a common direction. For example, as shown in the Figures, the legs 90, 92 may extend in a vehicle-rearward direction when the bumper assembly 16 is mounted to the vehicle 10. The first leg 90 and the second leg 92 may be parallel to each other. Alternatively, the first leg 90 and the second leg 92 may extend from the wall 88 in a vehicle-rearward direction at a non-parallel angle relative to each other.

Figure 2B:
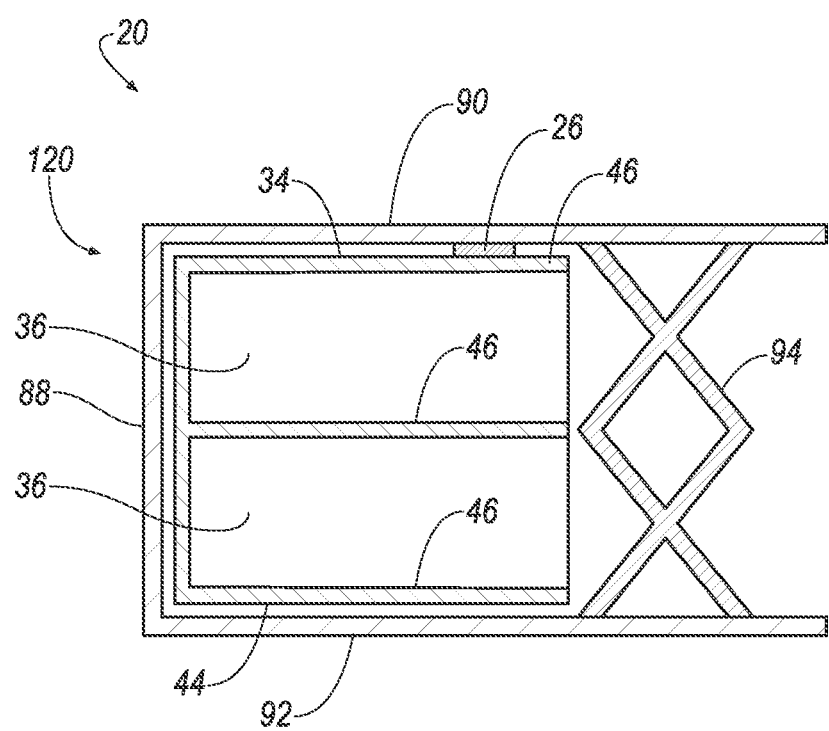
FIG. 2B is a cross-sectional view of the bumper taken along line 2B of FIG. 2A.

As set forth above, the stiffening ribs 94 extend between the two ends 22 of the carrier 120. For example, the stiffening ribs 94 may extend from one of the ends 22 to the other of the ends 22. The stiffening ribs 94 may be elongated from one of the ends 22 to the other of the ends 22. The stiffening ribs 94 may be of any suitable shape, e.g., X-shaped as shown in FIG. 2B.

With reference to FIG. 1, the vehicle 10 may include a front end 12 including the crush cans 14, the bumper 20, and the fascia 18 covering the bumper 20. The vehicle 10 may be any type of passenger or commercial vehicle such as a car, a truck, a sport utility vehicle, a taxi, a bus, etc.

The crush cans 14 may absorb energy from a vehicle impact and may be positioned behind the bumper 20, i.e., in a vehicle-rearward direction relative to the bumper 20 when the bumper assembly 16 is mounted to the vehicle 10. Specifically, the bumper 20 may be disposed between the crush cans 14 and the fascia 18.

The crush cans 14 have a proximal end 98 that may be mounted to a frame 84 of the vehicle 10. The crush cans 14 may be mounted to the frame in any suitable manner, e.g., fasteners, adhesives, ultrasonic welding, etc. When mounted to the frame 84, the crash cans 14 extend in a vehicle-forward direction to a distal end 100.

The crush cans 14 include a plurality of sides 102 extending from the proximal end 98 to the distal end 100. The crush cans 14 may have a polygonal cross-section, and may taper between the proximal end 98 and the distal end 100. The taper may be constant from the proximal end 98 to the distal end 100. The sides 102 of the crush cans may define a cavity (not numbered).

The sides 102 of the crush cans 14 may have a substantially constant thickness T from the proximal end 98 to the distal end 100. The thickness T may vary between the proximal end 98 and the distal end 100 as a result of tolerances and imperfections in the manufacturing process, e.g., 1-5%. As one example, the thickness of the sides 102 may be about 4.0 mm when the crush cans 14 are constructed of plastic.

The crush cans 14 may include a stiffening shelf 104. The stiffening shelf 104 may extend between the sides 102 in the cavity defined by the sides 102. The stiffening shelf 104 may extend from the proximal end 98 to the distal end 100 between the sides 102 of the crush cans 14. The stiffening shelf 104 may be constructed from the same type of material or a different type of material as the crush cans 14. The stiffening shelf 104 and the sides 102 may be integral with each other, i.e., formed together simultaneously as a single continuous unit, or may be formed separately and subsequently attached. A first embodiment of the crush cans 14 is shown in FIGS. 3A-3B, and a second embodiment of the crush cans is shown in FIGS. 4A-4B.

Figure 3A:
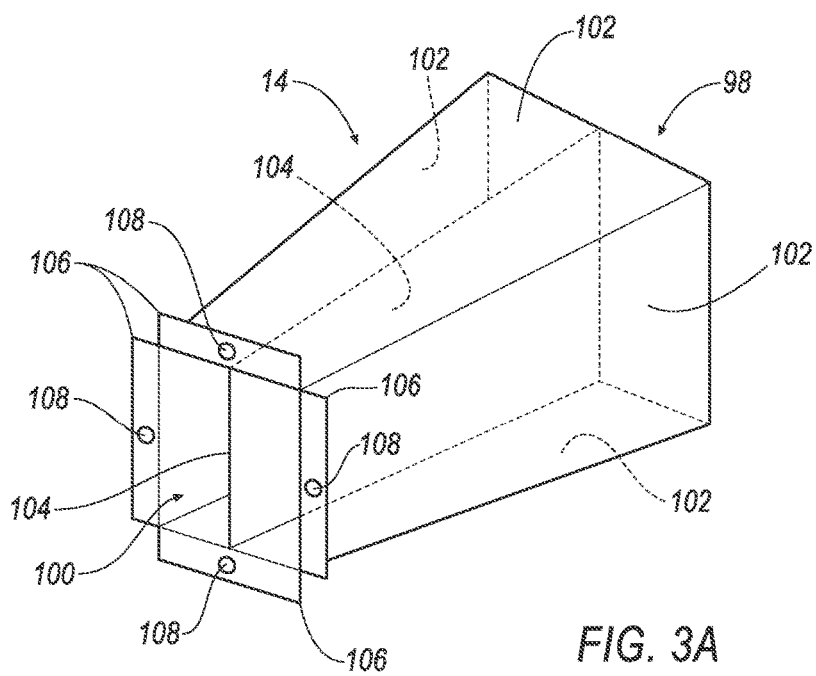
FIG. 3A is a perspective view of one embodiment of a crush can.
Figure 3B:
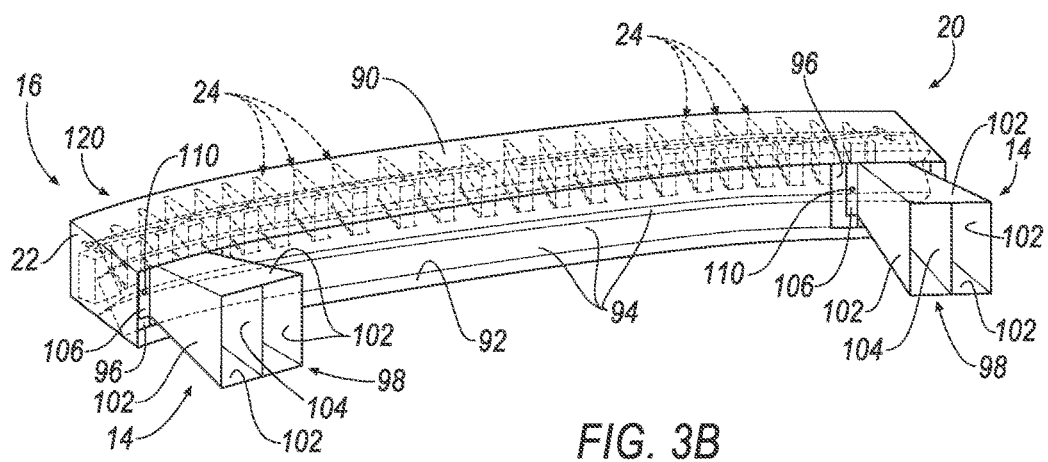
FIG. 3B is a perspective view of a bumper assembly, with the crush cans of FIG. 3A.
Figure 4A:
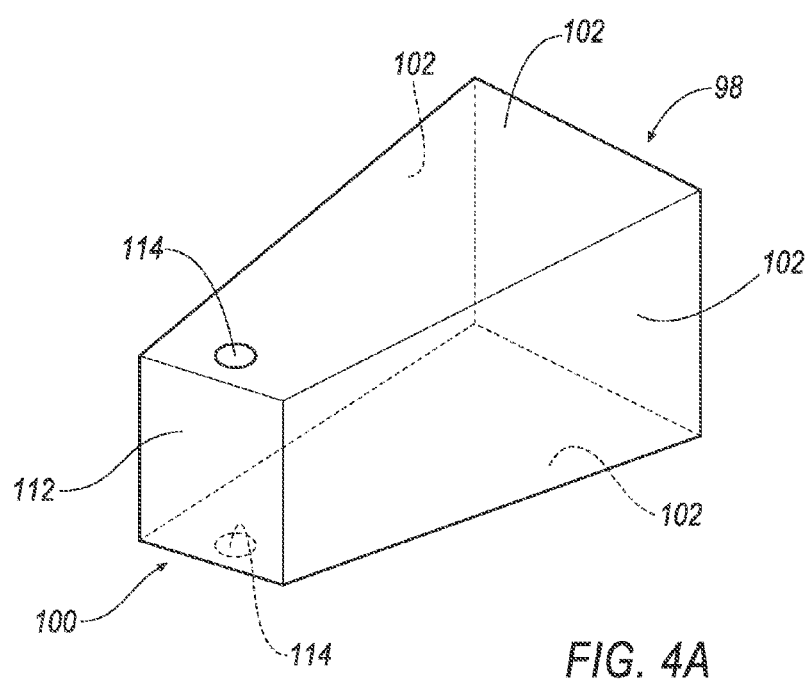
FIG. 4A is a perspective view of another embodiment of a crush can.
Figure 4B:
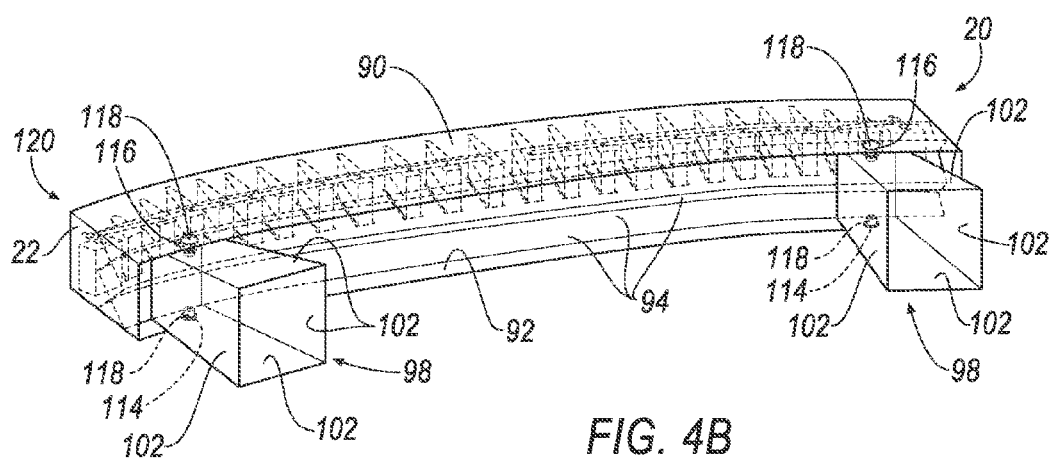
FIG. 4B is a perspective view of a bumper assembly, with the crush cans of FIG. 4A.

With reference to FIGS. 3A-3B, in the first embodiment, the distal end 100 of the crush cans 14 includes one or more flanges 106. The flanges 106 are configured to mount the crush cans 14 to the carrier 120. For example, as shown in FIGS. 3A-3B, the flanges 106 may define a plurality of holes 108 arranged for connection to the carrier 120.

With continued reference to the embodiment of the crush cans 14 shown in FIGS. 3A-3B, the carrier 120 may include plates 96 extending between and attached to the first leg 90 and the second leg 92. The plates 96 define holes (not shown) that align with the holes 108 of the flanges 106. As shown in FIG. 3B, fasteners 110, e.g., bolts, screws, etc., may extend through the holes 108 in the flanges 106 and into the aligned holes of the plate 96 to mount the bumper 20 to the crush cans 14. Alternatively, the flanges 106 may be fixed to the plate 96 in any other suitable manner, e.g., adhesives.

The fins 24 and the ribs 94 are disposed between the wall 88 and the plates 96. The plates 96 may be integral with the first leg 90 and the second leg 92 of the carrier 120, i.e., formed together simultaneously as a single continuous unit. Alternatively, the plates 96 may be formed separately from and subsequently attached to the first leg 90 and the second leg 92. The plates 96 may be the same type or a different type of material as the first leg 90 and the second leg 92.

The second embodiment of the crush cans 14 is shown in FIGS. 4A-4B. In this embodiment, the distal end 100 of the crush cans 14 include a can wall 112. One or more sides 102 of the crush cans 14 include apertures 114 proximate the distal end 100 of the crush cans 14. The first leg 90 and the second leg 92 of the carrier 120 may also define apertures 116 that align with the apertures 114 in the crush cans 14. The distal ends 100 of the crush cans 14 may be inserted between the first leg 90 and the second leg 92 of the carrier 120. Fasteners 118, e.g., bolts, screws, etc., may extend through the apertures 116 of the first leg 90 and/or the second leg 92 and into the aligned apertures 114 of the crush cans 14 to mount the bumper 20 to the crush cans 14. Additionally or alternatively, adhesives can be applied to the crush cans 14, e.g., the sides 102 of the crush cans 14 proximate the distal ends 100, to mount the bumper 20 to the crush cans 14.

As discussed above, the crush cans 14 may be constructed of plastic. Alternatively, the crush cans 14 may be constructed of metal, e.g., steel, aluminum, etc.

Referring to FIG. 1, the fascia 18 may cover the bumper 20 to provide an aesthetic appearance. During a vehicle impact, the fascia 18 may contact an impacted object, absorbing energy from the object. The fascia 18 may be constructed of any suitable material, e.g., a metal, a polymer (e.g., a plastic), a composite, etc. The fascia 18 may be flexible and/or brittle relative to the bumper 20. The fascia 18 may be attached to a body (not numbered), and/or to the bumper 20, and/or to the frame 84 of the vehicle 10.

With reference to FIGS. 1, 2A, 3B and 4B, and as described above, the bumper 20 may be attached to the crush cans 14 or to any suitable part of the vehicle 10. The bumper 20 is disposed between the crush cans 14 and the fascia 18.

Figure 5A:
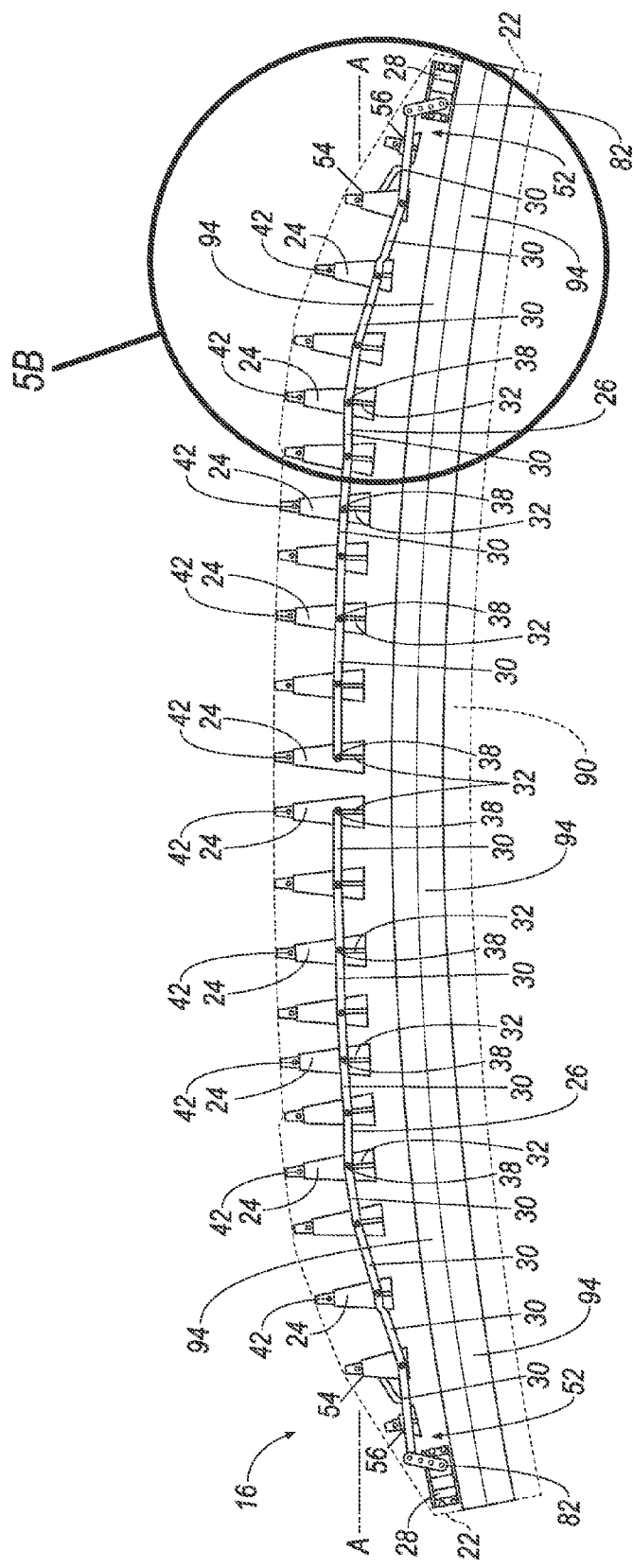
FIG. 5A is a plan view of one embodiment of a bumper including a carrier shown in hidden lines, fins in a deployed position, and stiffening ribs.
Figure 6:
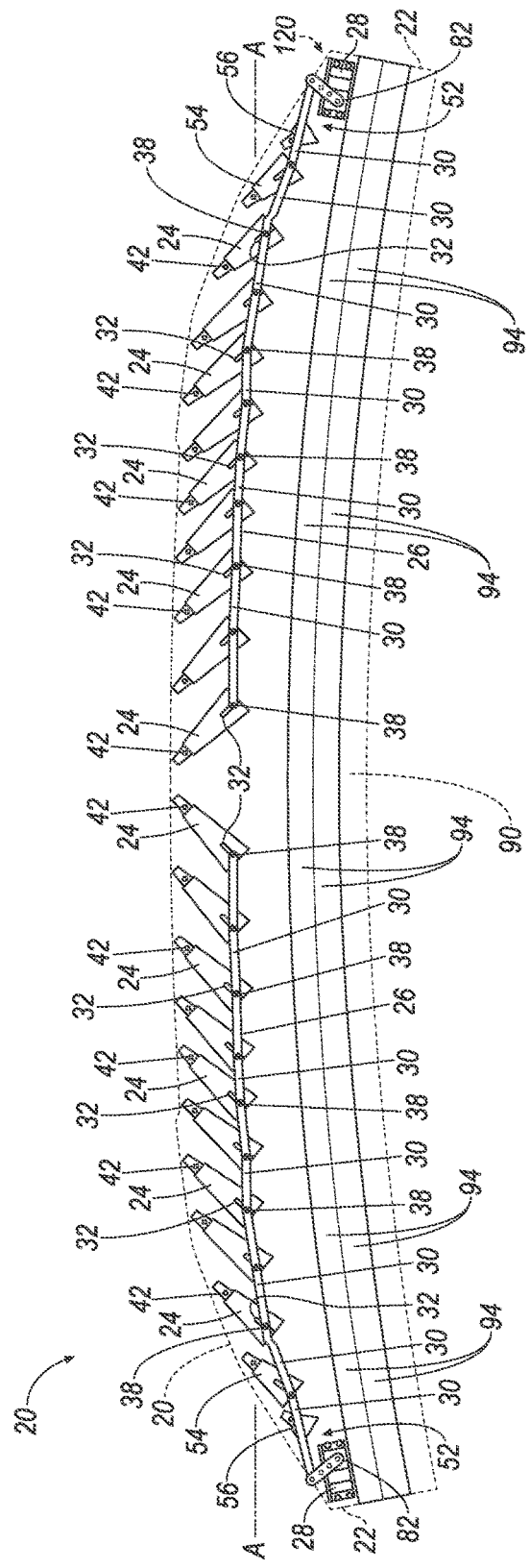
FIG. 6 is a plan view of the bumper of FIG. 5A with the fins in an inactive position.
Figure 7A:
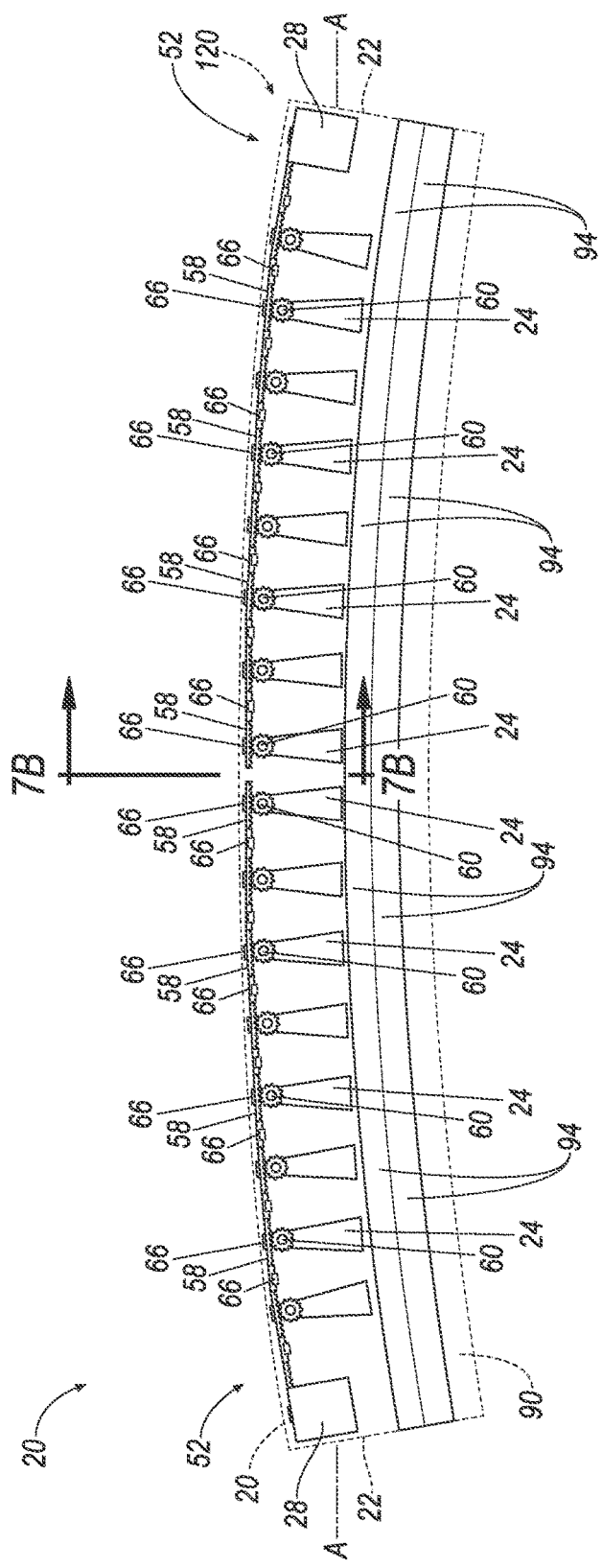
FIG. 7A is a plan view of another embodiment of a bumper including a carrier shown in hidden lines, fins in a deployed position, and stiffening ribs.
Figure 8:
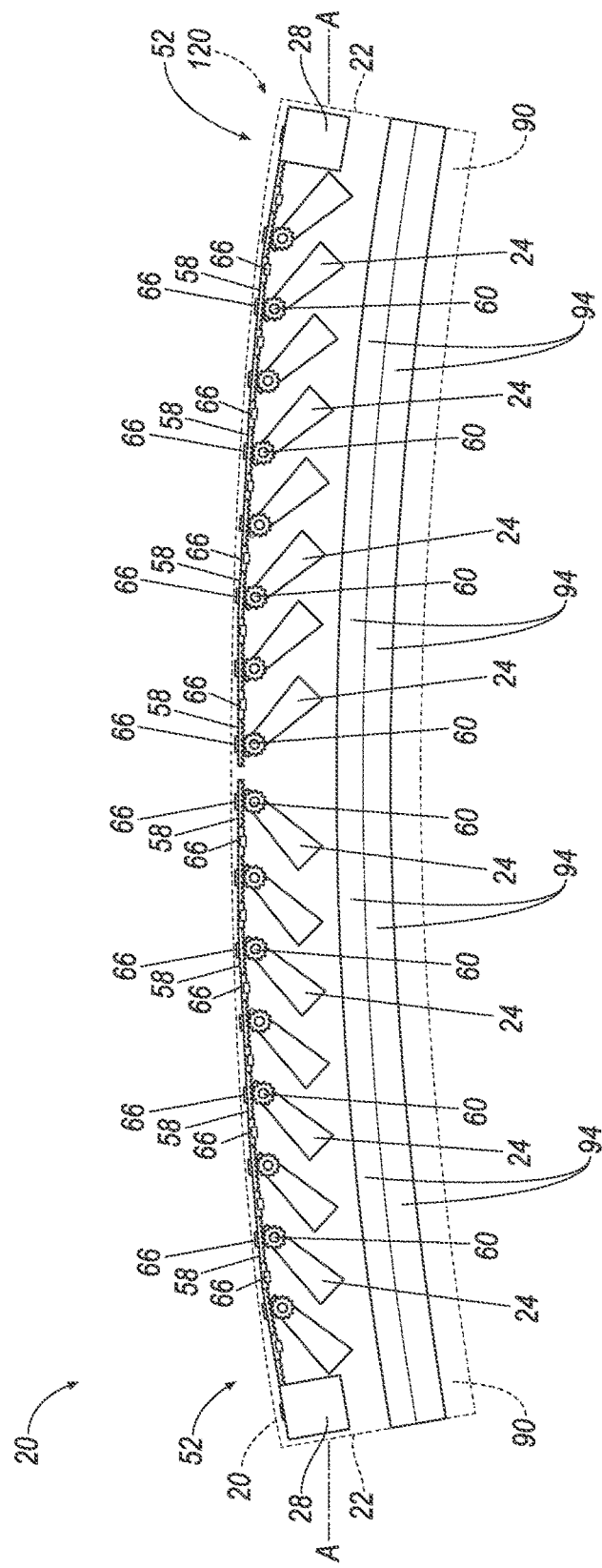
FIG. 8 is a plan view of the bumper of FIG. 7A with the fins moved to an inactive position.

The fins 24 are rotatable from a deployed position (also referred to as the "first position"), as shown in FIGS. 5A and 7A, to an inactive position (also referred to as the "second position"), as shown in FIGS. 6 and 8. In the deployed position, the fins 24 may extend in a direction substantially perpendicular with the longitudinal axis A of the bumper 20. Thus, in the deployed position, the fins 24 may reinforce the wall 88 of the bumper 20 and the fascia 18 by transferring force from the fascia 18 to the stiffening ribs 94, the plate 96, and the crush cans 14. Furthermore, the fins 24 may absorb energy during the impact, e.g., by deformation, fracture, etc. For example, as set forth below, the fins 24 may be in the deployed position when the vehicle 10 travels at low speed to reduce the likelihood of damage to the fascia 18 during a front-end impact.

In the inactive position, the fins 24 may extend in a direction that is non-perpendicular to the longitudinal axis A, as shown in FIGS. 6 and 8. For example, in the inactive position, the fins 24 may extend in a direction 40 degrees clockwise or counterclockwise relative to the direction that the fins 24 extend in the deployed position. Thus, in the inactive position, the stiffness of the bumper 20 and the fascia 18 may be decreased relative to when the fins 24 are in the deployed position. When the vehicle 10 travels at higher speed, the fins 24 may be moved to the inactive position to absorb energy from a pedestrian during a pedestrian-vehicle impact. In other words, the bumper assembly 16 provides variable stiffness to reduce the likelihood of damage to the vehicle 10 at low speed and to reduce the likelihood of pedestrian injury at higher speeds.

With reference to FIGS. 1, 2A, 5A, 6, 7A and 8, the carrier 120 of the bumper 20 may include any suitable number of fins 24 spaced from each other between the ends 22. For example, the number of fins 24 may be selected based on the energy absorption requirements of a particular speed and impact load, e.g., a 40% offset low-speed structural impact test protocol as prescribed by the Research Council for Automobile Repairs (RCAR). The carrier 120 may include a left bank of fins 24 and a right bank of fins 24. The left bank and the right bank may move independently between the deployed position and the inactive position.

The fins 24 taper in a direction transverse to the longitudinal axis A. The tapering of the fins 24 provide proper stiffness to reinforce a fascia 18 of the vehicle 10 when the fins 24 are in the deployed position, e.g., at low vehicle speed, to improve low-speed damageability of the vehicle 10. In other words, the tapering of the fins 24 may reinforce the fascia 18 to reduce the likelihood of damage to the fascia 18 during low-speed impacts. The tapering of the fins 24 also provides a swing angle of the fins 24 relative to the carrier 120 from the deployed position to the inactive position.

Specifically, with reference to FIGS. 5A and 7A, the fins 24 may taper in a direction transverse to the longitudinal axis A when the fins 24 are in the deployed position. In the deployed position, each fin 24 widens in a direction from the wall 88 of the carrier 120 toward the stiffening ribs 94, i.e., in a vehicle-rearward direction. As one example, the fins 24 may form a substantially V-shape in the direction transverse to the longitudinal axis A. Alternatively, the fins 24 may taper in any suitable shape.

Figure 5B:
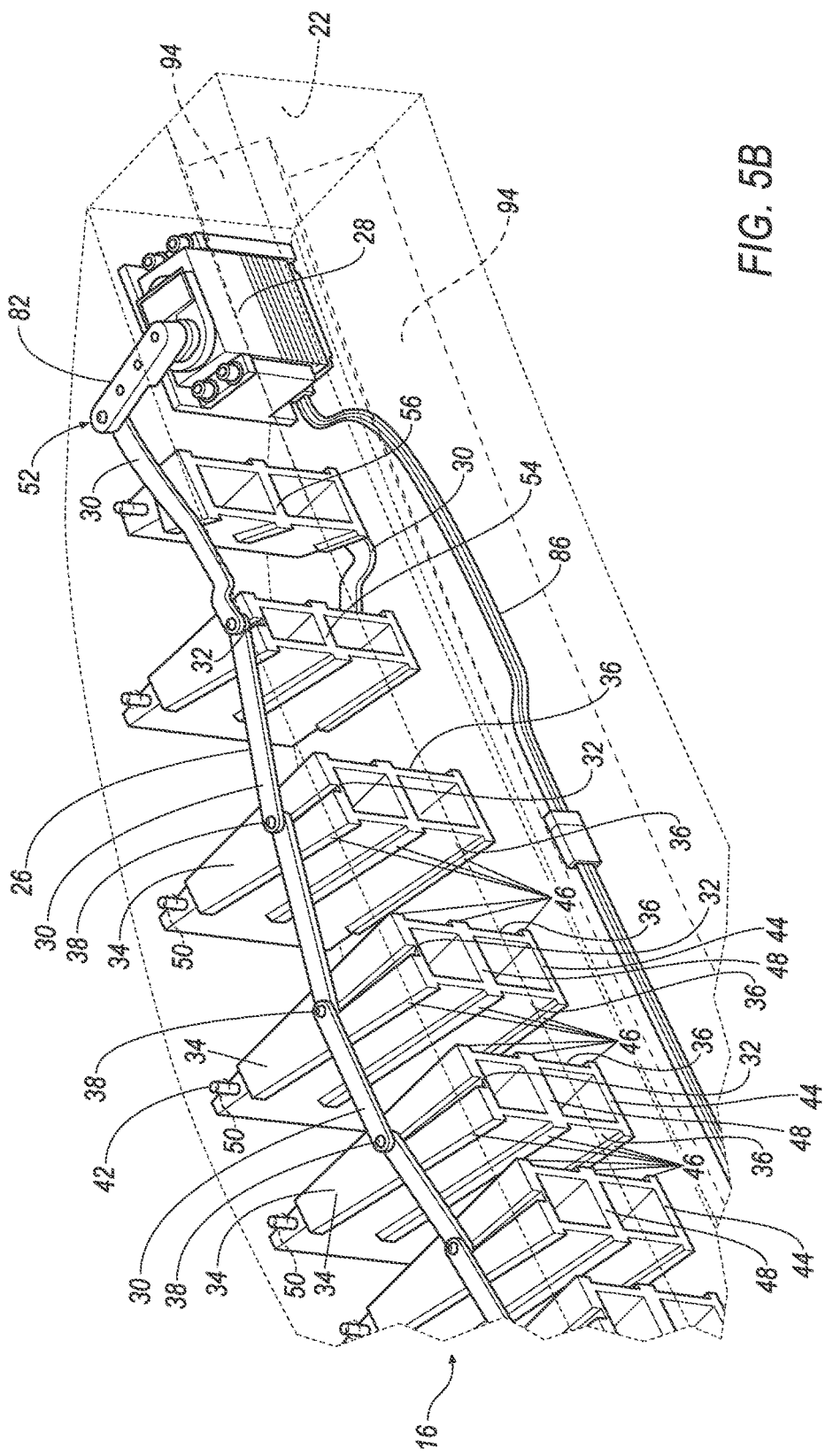
FIG. 5B is a perspective view of a magnified portion of the bumper identified in FIG. 5A.

As shown in FIG. 5B, the fins 24 may each include a top panel 34, side panels 36, and a bottom panel 44. In the example of FIG. 5B, the fins 24 include two side panels 36. The side panels 36 may each extend from the top panel 34 to the bottom panel 44. The top panel 34 and the bottom panel 44 connect the side panels 36 and reinforce the side panels 36 when subjected to a force, e.g., during an impact. The top panel 34 and the bottom panel 44 may be shaped to taper in the direction transverse to the longitudinal axis A, e.g., in a substantially triangular shape. The side panels 36 may be shaped in any suitable manner, e.g., in a substantially rectangular shape extending from the top panel 34 to the bottom panel 44.

Each fin 24 may include ribs 46 extending along the side panels 36. The ribs 46 reinforce the side panels 36 against buckling when subjected to an axial force. Each fin 24 may include a shelf 48 extending from one of the side panels 36 to the other of the side panels 36 between the top panel 34 and the bottom panel 44. The shelf 48 reinforces the side panels 36, the top panel 34, and the bottom panel 44 against buckling when subjected to an axial force.

As set forth above, the fins 24 are movably attached to the carrier 120. For example, the fins 24 may be rotatably attached to the carrier 120. Specifically, the fins 24 may be arranged along the longitudinal axis A of the bumper 20 to allow the fins 24 to rotate between the deployed position and the inactive position.

As one example, one of the fins 24 and the carrier 120 may include a pin 42 and the other of the fins 24 and the carrier 120 may include holes 50 rotatably receiving the pins 42. For example, as shown in FIGS. 5A, 5B and 6, the fins 24 each include pins 42 and the carrier 120 includes holes 50 rotatably receiving the pins. The pins 42 are retained in the holes 50.

Some or all of the fins 24 may vary in size and shape relative to each other. For example, as shown in FIGS. 5A-6, some of the fins 24 may have a common size and shape and some of the fins 24 may have a different size and shape. The fins 24 may be constructed of any suitable material, e.g., a polymer (e.g., a plastic), a composite, a metal, etc. For example, the fins 24 and the pins 42 may be constructed of a plastic that is a dissimilar plastic to the plastic from which the carrier 120 is formed to reduce resistance of the fins 24 and the pins 42 rotating in the holes 50 of the carrier 120. The fins 24 may be molded into the carrier 20 each as a unitary construction and joined with the carrier 20 by pins 42 molded into the carrier 20 and engaging the fins 24.

The bumper assembly 16 includes a driving assembly 52 connected to the fins 24, and an actuator 28 connected to the driving assembly 52. The driving assembly 52 transfers movement from the actuator 28 to the fins 24 to move the fins 24 between the deployed position and the inactive position. A first embodiment of the driving assembly 52 is shown in FIGS. 5A-6, and a second embodiment of the driving assembly 52 is shown in FIGS. 7A-8.

In the first embodiment, the driving assembly 52 includes a linkage 26 connecting the fins 24. The linkage 26 connects the actuator 28 to the fins 24 and transmits movement from the actuator 28 to the fins 24 to move the fins 24 between the deployed position and the inactive position.

The linkage 26 may include links 30 pivotally coupled to each other. Each link 30 may be connected to adjacent ones of the fins 24. For example, one of either the fins 24 or the links 30 each include a pin 38 and the other of either the fins 24 or the links 30 each include a slot 32 movably, e.g., slideably, receiving one of the pins 38. Specifically, in the embodiment shown in FIGS. 5A-6, the fins 24 each include one pin 38 and the links 30 each include one slot 32 receiving a respective pin 38. The links 30 may each have a specific length to specify the angle that each of the fins 24 rotates from the deployed position to the inactive position, e.g., 40 degrees. The specific lengths of the links 30 allow the fins 24 to rotate to greater angles in the inactive position without contacting other fins 24. The links 30 may be constructed of any suitable material, e.g., a polymer (e.g., a plastic), a composite, a metal, etc.

The actuator 28 may move the links 30, as set forth below, to move the fins 24 between the deployed position and the inactive position. For example, with reference to FIGS. 5A-6, the actuator 28 may pull the links 30 to move the fins 24 from the deployed position to the inactive position, and may push the links 30 to move the fins 24 from the inactive position to the deployed position. Alternatively, the actuator 28 may push the links 30 to move the fins 24 to the inactive position and may pull the links 30 to move the fins 24 to the deployed position. As the actuator 28 pushes/pulls the links 30, the pins 38 of the links 30 slide in their respective slots 32 as each fin 24 rotates about the pins 42 that are retained in the holes 50.

With reference to FIGS. 5B and 6, each bank of fins 24 may include an end fin 56 and a second fin 54. The actuator 28 may be connected directly to the second fin 54, e.g., with a link 30. In this configuration, another link 30 may connect the second fin 54 to the end fin 56. Here, because the space in the carrier 20 may be constrained toward the end 22, the end fin 56 may be too short to support one of the slots 32 and one of the pins 38. The linkage 26 may include a longer link 30 extending from the actuator 28 to the second fin 54, and the second fin 54 may include the link 30 connecting the second fin 54 to the end fin 56, e.g., connected to the bottom panels 44 of the second fin 54 and the end fin 56. When the actuator 28 pulls on the link 30 connecting to the second fin 54, the link 30 connecting the second fin 54 to the end fin 56 pushes the end fin 56.

The second embodiment of the driving assembly 52 is shown in FIGS. 7A-8. The driving assembly 52 of FIGS. 7A-8 includes a rack 58 and a plurality of pinions 60. The rack 58 connects the actuator 28 to the fins 24 and transmits movement from the actuator 28 to the fins 24 to move the fins 24 from the deployed position, as shown in FIG. 7A, to the inactive position, as shown in FIG. 8.

Figure 7B:
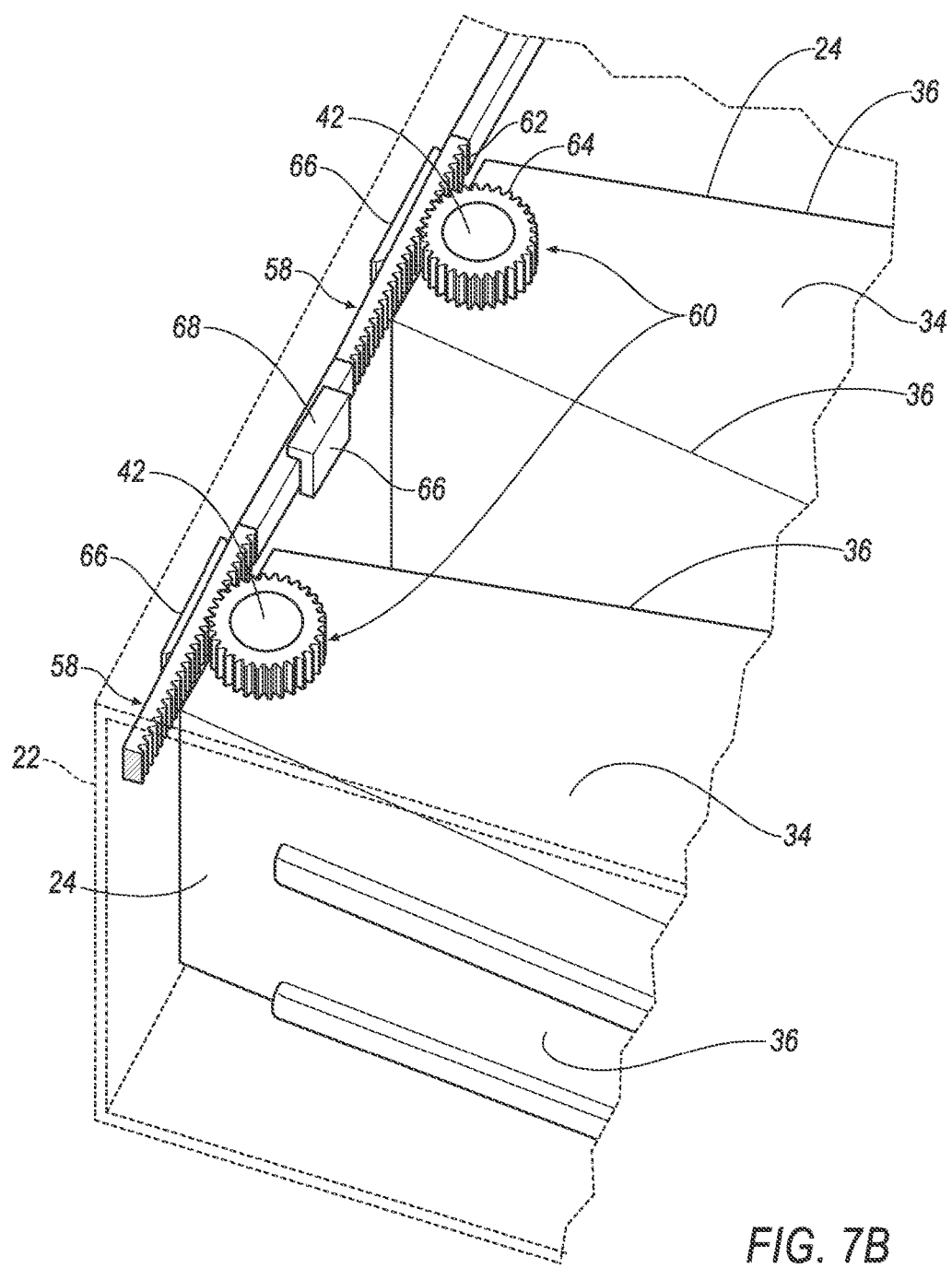
FIG. 7B is a cross-sectional view of a portion of the bumper along line 7B of FIG. 7A.

The rack 58 may be an elongated bar having teeth 62 that engage teeth 64 of the pinions 60, as shown in FIG. 7B. The teeth 62 may be shaped to engage the pinions 60 such that movement of the rack 58 results in rotation of the pinions 60. That is, each of the teeth 62 of the rack 58 may fit within a gap between the teeth 64 of the pinion 60, and when the rack 58 moves longitudinally, i.e., along the longitudinal axis A, the teeth 62 push or pull against the teeth 64. As the pinion 60 rotates, some the teeth 64 rotate away from the rack 58 and some of the teeth 64 rotate toward the rack 58, engaging the teeth 62. Thus, the longitudinal motion of the rack 58 may be translated to rotational motion of the pinion 60. The rack 58 may be constructed of any suitable material, e.g., a polymer (e.g., a plastic), a composite, a metal, etc.

Each fin 24 is fixed to one of the pinions 60, i.e., the respective fin 24 and pinion 60 move together as a unit. As shown in FIG. 7B, each of the pinions 60 may include one of the pins 42 extending through one of the holes 50 in the carrier 120 and connecting to one of the fins 24. The pins 42 may be fixedly attached to the pinions 60 and the fins 24 such that rotational motion of the pinions 60 is transferred to the fins 24 via rotation of the pins 42. That is, when the rack 58 pushes the pinions 60 such that the pinions 60 rotate, the pins 24 subsequently rotate about the pins 42, rotating the fins 24 from the deployed position to the inactive position. The pinions 60 may be spaced such that each of the fins 24 may rotate to the inactive position without contacting other fins 24, as shown in FIG. 8. The pinions 60 may be substantially circular or any suitable shape to rotate the fins 24 from the deployed position to the inactive position.

The rack 58 may be movably connected to the carrier 120 with tabs 66. For example, the carrier 120 may include a plurality of tabs 66 that engage the rack 58 to allow longitudinal motion of the rack 58. The tabs 66 may extend from the carrier 120 and engage the rack 58. As shown in FIG. 7B, one of the tabs 66 may include a flange 68 that permits the rack 58 to move only along the longitudinal axis A. One of the other tabs 66 may be positioned such that the rack 58 is between the pinion 60 and the tab 66, preventing the rack 58 from moving transverse to the longitudinal axis A and losing contact with the pinion 60. That is, the tab 66 may ensure that the rack 58 moves only along the longitudinal axis A. The tabs 66 may be formed simultaneously with the carrier 120, i.e., the tabs 66 may be a unitary construction with the carrier 120.

The driving assembly 52 in the second embodiment may include two racks 58, with one of the racks 58 connected to one of the actuators 28 and moving the left bank of fins 24, and the other of the racks 58 connected to the other actuator 28 and moving the right bank of fins 24. The racks 58 may move the left bank of fins 24 in one direction, e.g., clockwise about the pins 42, and the right bank of fins 24 in another direction, e.g., counterclockwise about the pins 42, as shown in FIG. 8.

As set forth above, the bumper assembly 16 includes the actuator 28. Specifically, the bumper assembly 16 may include two actuators 28, as shown in FIGS. 5A, 6, 7A and 8. In other words, one of the actuators 28 may move the left bank of fins 24 and the other of the actuators 28 may move the right bank of fins 24. The carrier 120 may support the actuators 28, e.g., at each end 22.

The actuator 28 may be, e.g., a stepper motor. The actuators 28 may be connected to the driving assembly 52 in any suitable manner. For example, as shown in FIGS. 5A-6, the actuator 28 may include an arm 82 connected to the linkage 26. The actuator 28 may be connected to a power source (not shown) with a wire harness 86, as shown in FIG. 5B. In the example of FIGS. 7A and 8, the actuators 28 may move the racks 58 linearly, i.e., along a linear path of motion, in any suitable manner. For example, the actuators 28 may each include one of the pinions 60 that engages the racks 58 to drive the racks 58 to rotate the fins 24. In another example, the actuators 28 may be linear actuators, solenoids, etc., or any other suitable device that drives the racks 58 in the direction along the longitudinal axis A.

Figure 9:
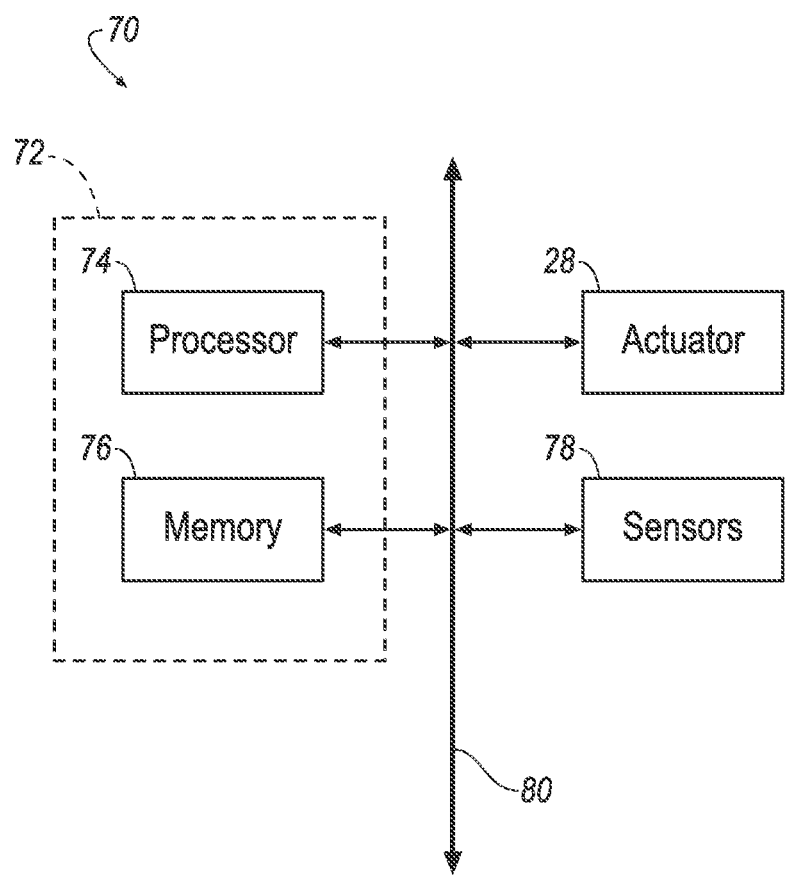
FIG. 9 is a block diagram of a vehicle speed sensing subsystem.

FIG. 9 illustrates a vehicle speed sensing subsystem 70. The subsystem 70 includes a controller 72, the actuator 28, a plurality of sensors 78, and a communications bus 80. The subsystem 70 may move the fins 24 relative to the carrier 120 from the deployed position to the inactive position based on the speed of the vehicle. For example, the controller 72 may instruct the actuator 28 to move the fins 24 to the deployed position in response to instruction from the sensors 78 that the speed of the vehicle 10 is below a threshold, e.g., a value between 15-30 KPH. The controller 72 may instruct the actuator 28 to move the fins 24 to the inactive position in response to instruction from the sensors 78 that the speed of the vehicle 10 is above a threshold, e.g., a value between 15-30 KPH. The sensors 78 may be, for example, a speed sensor that senses the speed of the vehicle and communicates the speed of the vehicle to the controller 72.

The controller 72 includes a processor 74 and a memory 76. The processor 74 may be programmed to receive instructions stored in the memory 76 and to send instructions to the actuator 28 to move the fins 24. The processor 74 may include any number of electronic components programmed to receive and process signals sent through the subsystem 70. The processor 74 generally receives data from the sensor 78 and may generate instructions to control the actuator 28. The memory 76 may be a data store, e.g., a hard disk drive, a solid-state drive, a server, or any volatile or non-volatile media. The memory 76 may store the data collected by the sensors 78.

The processor 74 may be programmed to detect the vehicle speed. The sensors 78, e.g., a speedometer, may detect the speed of the vehicle 10 and send the speed to the processor 74. Based on the vehicle speed, the processor 74 may send instructions to the actuator 28 to move the fins 24 from the deployed position to the inactive position.

The sensors 78 include a variety of devices. For example, the sensors 78 may be devices that collected data relating to, e.g., vehicle speed, acceleration, system and/or component functionality, etc. Further, sensors 78 may include mechanisms such as radar, lidar, sonar, etc.

The subsystem 70 includes the communications bus 80 to communicatively connect the sensors 78, the actuator 28, and the controller 72. The bus 80 sends and receives data throughout the subsystem 70, e.g., sending instructions from the processor 74 to the actuator 28 to move the fins 24. The bus 80 may be a controller area network (CAN) bus.

The subsystem 70 may transmit signals through a communication network 80 (such as a controller area network (CAN) bus), Ethernet, and/or by any other wired or wireless communication network. The controller 72 may use information from the communication network 80 to control the actuator 28.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:
1. A bumper comprising;
a carrier having a wall extending along a longitudinal axis and a first leg and a second leg spaced from each other and extending in a first direction away from the wall;

a plurality of fins movably attached to the carrier between the first leg and the second leg and spaced from each other along the longitudinal axis; and ribs fixed to the first leg and the second leg.

2. The bumper of claim 1, wherein the plurality of fins are disposed between the wall and the ribs.

3. The bumper of claim 1, wherein the carrier has first end and a second end spaced from each other along the longitudinal axis and the ribs extend between the first end and the second end.

4. The bumper of claim 1, wherein at least one plate is attached between the first leg and the second leg, and the plurality of fins and the ribs are disposed between the wall and the at least one plate.

5. The bumper of claim 4, wherein the carrier has a first end and a second end spaced from each along the longitudinal axis and the at least one plate is at one of the first and second ends.

6. The bumper of claim 1, wherein the carrier and the ribs are constructed of plastic.

7. The bumper of claim 1, further comprising a driving assembly connected to the fins, and an actuator connected to the driving assembly.

8. The bumper of claim 7, wherein the driving assembly is a linkage connecting the actuator and the fins.

9. The bumper of claim 7, wherein the driving assembly is a rack and a plurality of pinions connecting the actuator and the fins.

10. A bumper assembly comprising:

a carrier having a wall extending along a longitudinal axis and a first leg and a second leg spaced from each other and extending in a first direction away from the wall;

a plurality of fins movably attached to the carrier between the first leg and the second leg and spaced from each other along a longitudinal axis of the carrier;

ribs fixed to the first leg and the second leg;

a first crush can and a second crush can each mounted to the carrier.

11. The bumper assembly of claim 10, wherein the carrier has two ends spaced from each other along the longitudinal axis and the ribs extend from the first end to the second end.

12. The bumper assembly of claim 10, wherein the carrier further comprises a first plate and a second plate each attached to the first leg and the second leg, the first crush can mounted to the first plate and the second crush can mounted to the second plate.

13. The bumper assembly of claim 12, wherein the carrier has a first end and a second end, and the first plate is proximate the first end, and the second plate is proximate the second end.

14. The bumper assembly of claim 12, wherein the plurality of fins and the ribs are disposed between the wall and the first plate and the second plate.

15. The bumper of claim 10, wherein the carrier and the ribs are constructed of plastic.

16. The bumper assembly of claim 10, wherein at least one of the first crush can and the second crush can includes sides defining a cavity and a stiffening shelf extending between the sides in the cavity.

17. The bumper assembly of claim 10, herein the first crush can and the second crush can are constructed of plastic.

18. The bumper assembly of claim 10, further comprising a driving assembly connected to the fins, and an actuator connected to the driving assembly.

19. The bumper assembly of claim 18, wherein the driving assembly is a linkage connecting the actuator and the fins.

20. The bumper assembly of claim 18, wherein the driving assembly is a rack and a plurality of pinions connecting the actuator and the fins.

* * * * *

UNITED STATES PATENT AND TRADEMARK OFFICE
CERTIFICATE OF CORRECTION

PATENT NO. : 9,919,667 B2  
APPLICATION NO. : 15/193634  
DATED : March 20, 2018  
INVENTOR(S) : Nirmal Muralidharan et al.

Page 1 of 1

It is certified that error appears in the above-identified patent and that said Letters Patent is hereby corrected as shown below:

On the Title Page

Item (57), Line 5 of the Abstract:     Insert --along-- after "other";

In the Claims

Column 9, Line 1 of Claim 3:     Insert --a-- after "has";

Column 9, Line 3 of Claim 4:     Insert --the-- after "of";

Column 10, Line 2 of Claim 14:     Insert --the-- after "of"; and

Column 10, Line 1 of Claim 17:     Change "herein" to --wherein--.

Signed and Sealed this  
Fifteenth Day of May, 2018

Andrei Iancu  
*Director of the United States Patent and Trademark Office*